United States Patent [19]

Reuter

[11] 4,023,075
[45] May 10, 1977

[54] INDUCTORLESS SYMMETRICAL COMPONENT SEQUENCE ANALYZER

[75] Inventor: William L. Reuter, Rapid City, S. Dak.

[73] Assignee: Dunham Associates, Inc., Rapid City, S. Dak.

[22] Filed: Nov. 19, 1975

[21] Appl. No.: 633,564

Related U.S. Application Data

[63] Continuation of Ser. No. 451,115, March 14, 1974, abandoned.

[52] U.S. Cl. .................................. 361/76; 324/86; 361/77
[51] Int. Cl.² .................................. H02H 3/28
[58] Field of Search ............ 317/47, 48, 27 R, 43; 307/127; 340/253 Y; 324/107, 108, 86

[56] References Cited
UNITED STATES PATENTS

| | | | |
|---|---|---|---|
| 2,836,771 | 5/1958 | Jessee | 317/48 X |
| 3,188,522 | 6/1965 | Culbertson | 317/48 |
| 3,211,993 | 10/1965 | Golden et al. | 324/86 X |
| 3,215,865 | 11/1965 | Grimme, Jr. | 317/48 |
| 3,551,748 | 12/1970 | Maynard | 317/48 X |
| 3,611,050 | 10/1971 | Weber | 317/27 R X |
| 3,736,470 | 5/1973 | Ford et al. | 317/48 X |

Primary Examiner—J D Miller
Assistant Examiner—Patrick R. Salce
Attorney, Agent, or Firm—Merchant, Gould, Smith, Edell, Welter & Schmidt

[57] ABSTRACT

Sequence analyzers or wave filters having resistance and capacitance elements only, for providing output signals having a magnitude proportional to the magnitude of the positive or negative sequence symmetrical component of a three-phase power source. By eliminating the need for inductors or transformers substantial reductions in size, weight and cost are realized. Four, five and eight element embodiments are disclosed, the latter providing an output referenced to the power system neutral.

8 Claims, 4 Drawing Figures

INDUCTORLESS SYMMETRICAL COMPONENT SEQUENCE ANALYZER

This is a continuation of application Ser. No. 451,115, filed Mar. 14, 1974, and now abandoned.

BACKGROUND OF THE INVENTION

The present invention pertains generally to the field of sequence analyzers for polyphase power systems, and more particularly to sequence analyzers for three-phase power systems which provide an output voltage having a magnitude proportional to the magnitude of the positive or negative symmetrical component of the power system.

Sequence analyzers find many useful applications in electrical power transmission, distribution, monitoring and control systems. In such applications, sequence analyzers are used as sensors for providing certain data concerning the nature of the voltages present in the three-phase power system. These data are then used as inputs to a decision making process, either by a human operator or by an automatic control system.

One type of prior art sequence analyzer gives a qualitative indication of a given power connection as to whether it is positive or negative sequence, but does not give any quantitative measurement of the magnitude of the symmetrical component. Often such devices comprise some type of wave filter and a neon lamp, for example, which lights when the device is connected in positive sequence, but not negative sequence. Such analyzers are useful to line men and electrical equipment installers to provide a field check of the sequence of a proposed connection prior to installaton of the equipment. However, the indicating threshold of devices in this class of prior art sequence analyzers is usually rather indeterminate, and it is not possible to determine the magnitude of the components which may be present, but only their sequence. Analyzers in this class of prior art devices are generally incapable of providing an output magnitude proportional to the magnitude of the symmetrical component, as are the sequence analyzers according to the present invention.

A second general classification of prior art sequence analyzers includes a large number of circuits, also called wave filters or sequence segregating networks, which are capable of producing a desired output signal having a magnitude proportional to the magnitude of a symmetrical component. The prior art includes many individual circuits designed to produce this result. Although the exact configuration of these prior art sequence analyzers varies widely, in general they all comprise a plurality of circuit elements connected in a manner to act upon the input power signal to filter out and isolate a voltage or a current which is indicative of the magnitude of the symmetrical component.

This class of sequence analyzers is, of course, necessary in monitoring systems in which control decisions are to be made on the basis of maintaining the positive and negative sequence symmetrical components within predetermined tolerance limits. For example, control by means of positive and negative sequence symmetrical components has proven to be most useful in protecting motors and other loads from possible damage which could result from continued operation of the motor when faults have occurred on the power line. In addition to being able to detect overvoltage and undervoltage conditions, which could also be detected by voltage averaging type circuits, symmetrical component sequence analyzers have the advantage of being able to detect voltage imbalances among the phases. Motor protection circuits may be designed to operate in response to the signals produced by the symmetrical component sequence analyzer to disconnect the load when an out-of-tolerance condition is detected.

One disadvantage of prior art sequence analyzers for this purpose is that in general they include inductors or transformers. The weight, size and cost of the transformers and/or inductors and their associated magnetic cores makes these circuits unsuitable for many applications.

The present invention achieves advantages in reduced weight, size, and cost by providing symmetrical component sequence analyzers which use only resistive and capacitive elements. The elimination of inductors and transformers also leads to improvements in linearity.

SUMMARY OF THE INVENTION

According to the present invention, positive and negative symmetrical component sequence analyzers are provided consisting only of resistive and capacitive circuit elements. Input means apply the voltages of a three-phase power supply to the resistance-capacitance network, which develops in response thereto, an output voltage across an output load impedance. The magnitude of this output voltage is proportional to the symmetrical component of the power supply, either positive or negative depending upon the order of connection of the power supply to the analyzer circuit. In one embodiment two resistances and two capacitances perform the analysis function. In a second embodiment, three resistances and two capacitances perform the same function. In a third embodiment four resistance elements and four capacitance elements comprise the sequence analyzer circuit, with the output voltage appearing across a load impedance having one terminal connected to the power system neutral.

DESCRIPTION OF THE PREFERRED EMBODIMENTS

Figure 1:
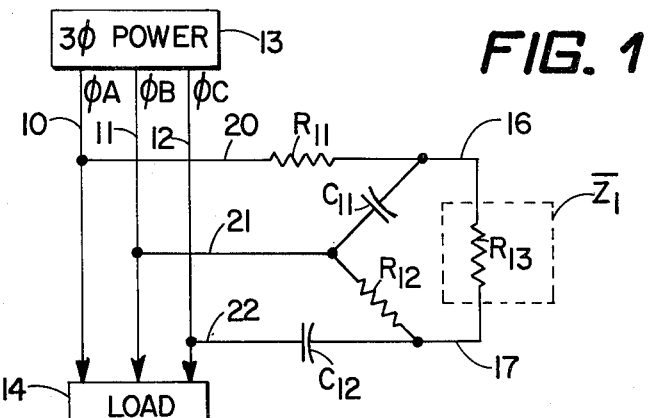
FIG. 1 is a schematic diagram of the four element embodiment of a symmetrical component sequence analyzer according to the present invention.

In FIG. 1, reference numerals 10, 11 and 12 designate three electrical conductors which are connected to a source of three-phase power 13. The other ends of conductors 10, 11 and 12 would, in practice, be connected to a load 14. For example, three-phase power source 13 may include a transmission line bringing the three-phase power from a remote generating point to the load 14, which may be an electric motor.

Leads 20, 21 and 22 are connected respectively to power lines 10, 11 and 12. Leads 2–22 comprise input means for connecting the three-phase power to the remainder of the circuit. Leads 16 and 17 comprise output terminals for the circuit. $\overline{Z}_1$ is an output load impedance connected between leads 16 and 17, which in the embodiment shown comprises a resistance $R_{13}$. Another resistor, $R_{11}$ is connected between lead 20 and one terminal of $R_{13}$. A capacitor $C_{11}$ is connected between lead 21 and the junction of resistors $R_{11}$ and $R_{13}$. A resistor $R_{12}$ is connected from lead 21 to the other terminal of resistor $R_{13}$, and a capacitor $C_{12}$ connects from the same point to lead 22.

If certain constraints are placed on the values of the circuit elements in FIG. 1, then the output voltage $\overline{V}_1$ will be equal to the positive-sequence symmetrical component times a constant. It is not known whether more than one set of constraints will lead to this result, but it is known that the following set of constraints will result in the desired proportionality.

Specifically, if $$1/\omega C_{11} = \sqrt{3\,R_{11}}$$
$$1/\omega C_{12} = K_1/2 \sqrt{3\,R_{11}} \text{ and}$$
$$R_{12} = K_1/2R_{11}$$

where $K_1$ is an arbitrary real positive constant, network analysis techniques, such as mesh or nodal analysis, yield that the output voltage, which is the voltage drop across output load $\overline{Z}_1$ from the $C_{11}$ connection to the $C_{12}$ connection is $$\overline{V}_1 = \left\{ \frac{12\sqrt{3}\,e^{j40°}\,R_{11}\overline{Z}_1}{\sqrt{3}\,(K_1 + 2R_{11}^2) + j(K_1 + 6R_{11}^2 + 8R_{11}\overline{Z}_1)} \right\} \left( \frac{\overline{V}_{10} + e^{j120°}\,\overline{V}_{11} + e^{j240°}\,\overline{V}_{12}}{3} \right)$$

$$= \alpha_1 e^{j\theta_1} \left( \frac{\overline{V}_{10} + e^{j120°}\,\overline{V}_{11} + e^{j240°}\,\overline{V}_{12}}{3} \right)$$

where $\overline{V}_{10}$, $\overline{V}_{11}$, and $\overline{V}_{12}$ are the phasor representations of the voltage drops from conductors 10–12, respectively, to the three-phase power system neutral.

If the line voltage sequence is 10, 11 and 12, then, by definition, $$\frac{\overline{V}_{10} + e^{j120°}\,\overline{V}_{11} + e^{j240°}\,\overline{V}_{12}}{3}$$

is the positive sequence symmetrical component of $\overline{V}_{10}$, a voltage that has the same magnitude and phase angle as $\overline{V}_{10}$ under normal balanced conditions. Thus, the magnitude of $\overline{V}_1$ equals $\alpha_1$ times the magnitude of the positive-sequence symmetrical component, and the phase angle of $\overline{V}_1$ equals the phase angle of the positive-sequence symmetrical component of $\overline{V}_{10}$ plus a constant, $\theta_1$.

Any singular deviation in the magnitude or angle of $\overline{V}_{10}$, $\overline{V}_{11}$, or $\overline{V}_{12}$ from normal balanced conditions will cause a variation in $\overline{V}_1$. Simultaneous deviations in $\overline{V}_{10}$, $\overline{V}_{11}$, and $\overline{V}_{12}$ usually cause even greater variations in $\overline{V}_1$. Thus, $\overline{V}_1$ provides an indication that line voltages have deviated from normal balanced conditions except in those unusual cases when two or more deviations mathematically cancel. In any event, $\overline{V}_1$ provides an indication of the three-phase voltage components that develop the torque which causes a three-phase motor to rotate in a prescribed direction.

If leads 21 and 22 are interchanged in FIG. 1 while all other connections and constraints remain the same, then the voltage drop across output load $\overline{Z}_1$ from the $C_{11}$ connection to the $C_{12}$ connection becomes $$\overline{V}_1 = \alpha_1 e^{j\theta_1} \left( \frac{\overline{V}_{10} + e^{j120°}\,\overline{V}_{12} + e^{j240°}\,\overline{V}_{11}}{3} \right)$$

If the line voltage sequence is still 10, 11 and 12, then by definition, $$\frac{\overline{V}_{10} + e^{j120°}\,\overline{V}_{12} + e^{j240°}\,\overline{V}_{11}}{3}$$

is the negative-sequence symmetrical component of $\overline{V}_{10}$, a voltage that theoretically has zero magnitude under normal balanced conditions. Hence, the magnitude of $\overline{V}_1$ equals $\alpha_1$ times the magnitude of the negative-sequence symmetrical component, and the phase angle of $\overline{V}_1$ equals the phase angle of the negative-sequence symmetrical component of $\overline{V}_{10}$ plus a constant, $\theta_1$.

Any singular deviation in the magnitude or angle of $\overline{V}_{10}$, $\overline{V}_{11}$, or $\overline{V}_{12}$ from normal balanced conditions will create a nonzero $\overline{V}_1$. Simultaneous deviations in $\overline{V}_{10}$, $\overline{V}_{11}$, and $\overline{V}_{12}$ usually cause even greater variations in $\overline{V}_1$. Thus, $\overline{V}_1$ also provides an indication that line voltages have deviated from normal balanced conditions except in those cases when two or more deviations mathematically cancel, such as occurs when all three-phase voltages remain balanced but simultaneously change in magnitudes. In any event, $\overline{V}_1$ provides an indication of the three-phase voltage components that develop a countertorque which opposes the prescribed rotation of a three-phase motor.

In practical applications of the circuit of FIG. 1, the output load impedance $\overline{Z}_1$ may in fact be the input to a utilization circuit which uses the symmetrical component voltage developed. For example, $\overline{Z}_1$ may be a relay whose winding has the resistance $R_{13}$. The relay contacts could be wired to control the connection of load 14 to the three-phase power source. The pull in voltage of the relay can be selected so that the load would be disconnected when the magnitude of the symmetrical component exceeded a predetermined value. Alternatively, the relay could be selected to disconnect the load when the magnitude of the symmetrical component dropped below a predetermined value. By simply interchanging any pair of leads 20–22, the same circuit of FIG. 1 will produce an output voltage across output $\overline{Z}_1$ having a magnitude proportional to the magnitude of the negative-sequence symmetrical component. In that case, a relay used as the output load could be selected to disconnect the load from the power source if the magnitude of the negative-sequence symmetrical component exceeded a certain value. From the equations shown above, it is apparent that there are three free parameters, for example, $R_{11}$, $\overline{Z}_1$, and $K_1$. These three parameters can be selected for a given application of the circuit to provide the desired constant of proportionality, within the limits of the system, and thereby determine the relationship of the magnitude and phase angle of the output voltage to the symmetrical component in question.

Of course, in other applications of the circuit of FIG. 1, the output load $\overline{Z}_1$ may be the input to an electronic threshold detecting and switching circuit. In such case, the resistance $R_{13}$ would represent the input resistance of such a circuit.

Figure 2:
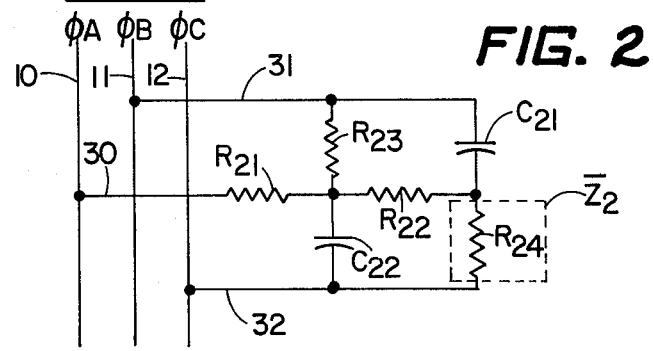
FIG. 2 is a schematic diagram of a five element embodiment.

In FIG. 2, conductors 10, 11 and 12 represent a line for carrying three-phase power. In practice, lines 10–12 would also be connected to a source of three-phase power and to a load (not shown), as in FIG. 1. Leads 30, 31 and 32 are connected respectively to lines 10–12, and comprise input means for connecting the three-phase power to the remainder of the circuit.

$\overline{Z}_2$ designates an output load impedance, which in the embodiment shown comprises a resistance $R_{24}$. A pair of resistors $R_{21}$ and $R_{22}$ are connected in series between lead 30 and the upper terminal of $\overline{Z}_2$. Also connected to the upper terminal of $\overline{Z}_2$ is a capacitor $C_{21}$, which connects to lead 31. A resistor $R_{23}$ connects from lead 31 to the junction of resistors $R_{21}$ and $R_{22}$. One side of a capacitor $C_{22}$ is connected to the last mentioned circuit node, and its other side is connected to lead 32, which also connects to the lower terminal of $\overline{Z}_2$.

In certain constraints are placed on the values of the circuit elements in FIG. 2, then the output voltage $\overline{V}_2$ will be equal to the positive-sequence symmetrical component times a constant. It is not known whether more than one set of constraints will lead to this result, but it is known that the following set of constraints will result in the desired proportionality.

Specifically, if $$\frac{1}{\omega C_{21}} = \frac{2[R_{21}^2 R_{23}^2 + K_2(2R_{21}^2 + 3R_{21}R_{23} + R_{23}^2)]}{\sqrt{3} \, R_{21}R_{23}^3},$$

$$\frac{1}{\omega C_{22}} = \frac{\sqrt{3} \, K_2 R_{21}R_{23}^2}{R_{21}^2 R_{23}^2 + K_2(2R_{21}^2 + 3R_{21}R_{23} + R_{23}^2)},$$

and $$R_{22} = K_2 \left( \frac{2R_{21} + R_{23}}{R_{21}R_{23}^2} \right)$$

where $K_2$ is an arbitrary real positive constant, network analysis techniques, such as mesh analysis, yield that the output voltage, which is the voltage drop across output load impedance $\overline{Z}_2$ from the $C_{21}$ connection to the $C_{22}$ connection is $$\overline{V}_2 = -\frac{6K_2\overline{Z}_2}{\overline{D}_2} \left( \frac{\overline{V}_{10} + e^{j120°} \overline{V}_{11} + e^{j240°} \overline{V}_{12}}{3} \right)$$

$$= \alpha_2 e^{j\theta_2} \left( \frac{\overline{V}_{10} + e^{j120°} \overline{V}_{11} + e^{j240°} \overline{V}_{12}}{3} \right),$$

where $\overline{V}_{10}$, $\overline{V}_{11}$, and $\overline{V}_{12}$ are the phasor representations of the voltage drops from conductors 10–12, respectively, to the three-phase power system neutral and where $\overline{D}_2$, the mesh system determinant, is given by $$\overline{D}_2 = R_{21} R_{22} R_{23} \overline{Z}_2$$

$$- \left( \frac{R_{21}R_{22} + R_{21}R_{23} + R_{21}\overline{Z}_2 + R_{22}R_{23} + R_{23}\overline{Z}_2}{\omega^2 C_{21}C_{22}} \right)$$

$$- j \left( \frac{R_{21}R_{22} + R_{21}R_{23} + R_{22}R_{23}}{\omega C_{22}} \right) \overline{Z}_2$$

$$- j \left( \frac{R_{22} + \overline{Z}_2}{\omega C_{21}} \right) R_{21}R_{23}.$$

As in the embodiment of FIG. 1, if the line voltage sequence is 10, 11, and 12, then the magnitude of $\overline{V}_2$ equals $\alpha_2$ times the magnitude of the positive-sequence component, and the phase angle of $\overline{V}_2$ equals the phase angle of the positive-sequence symmetrical component of $\overline{V}_{10}$ plus a constant, $\theta_2$.

If leads 31 and 32 are interchanged in FIG. 2 while all other connections and constraints along with the line voltage sequence remain the same, then the magnitude of $\overline{V}_2$ equals $\alpha_2$ times the magnitude of the negative-sequence symmetrical component, and the phase angle of $\overline{V}_2$ equals the phase angle of the negative-sequence symmetrical component of $\overline{V}_{10}$ plus a constant, $\theta_2$.

As was pointed out above with respect to the circuit of FIG. 1, the output load $\overline{Z}_2$ of FIG. 2 may be the input to a utilization device, which may be a relay or an electronic circuit. The resistance $R_{24}$ represents the input impedance of such a utilization device. With the connection of input leads 30–32 shown in FIG. 2, the magnitude of the output voltage is proportional to the magnitude of the positive-sequence symmetrical component. Reversing of any pair of leads would result in the developing of a voltage at output load $\overline{Z}_2$ having a magnitude proportional to the magnitude of the negative-sequence symmetrical component.

In the design of a sequence analyzer according to FIG. 2 for a particular application, there are four free parameters, for example $R_{21}$, $R_{23}$, $K_2$ and $\overline{Z}_2$, that can be selected, in consideration of the desired relationship between the magnitude and phase angle of output voltage to the symmetrical component in question. One advantage of the circuit of FIG. 2 is that the output element has one terminal connected directly to one of the power lines (12). This feature allows the use of a common terminal in case two analyzers are used in a given application, one being connected to sense positive sequence and the other being connected for negative sequence. The output voltage would appear across two resistors having one common terminal, which proves to be advantageous if electronic switching systems are used to sense the developed voltages.

Figure 3:
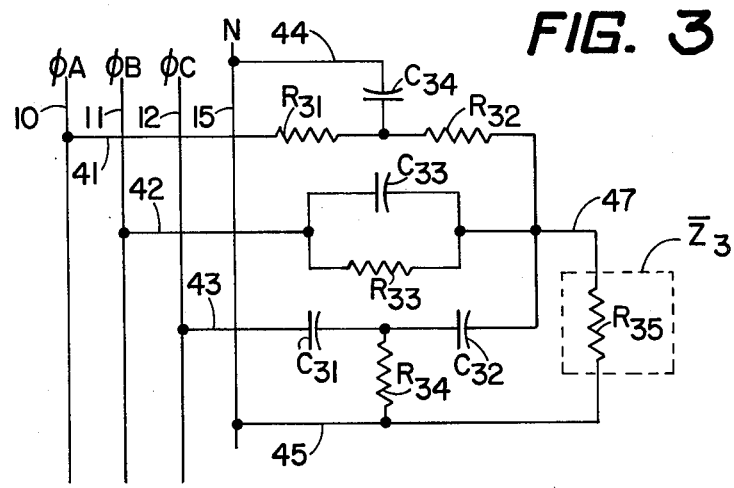
FIG. 3 is a schematic diagram of an eight element embodiment according to the present invention.

In FIG. 3, reference numerals 10, 11 and 12 again designate the three lines of a three-phase power system, which are connected to the indicated phases of a three-phase power source (not shown). In addition, reference numeral 15 indicates a fourth line which is connected to the system neutral of the three-phase power system. Leads 41, 42, and 43 are connected respectively to power lines 10, 11 and 12, and comprise input means for connecting the three-phase power to the analyzer circuit. $\overline{Z}_3$ designates an output load, which in the embodiment shown, comprises a resistor $R_{35}$. A pair of resistors $R_{31}$ and $R_{32}$ are connected in series from lead 41 to lead 47, which connects to the upper terminal of $\overline{Z}_3$. A pair of capacitors $C_{31}$ and $C_{32}$ are connected in series from lead 43 to lead 47. A resistor $R_{33}$ and a capacitor $C_{33}$ are connected in parallel from lead 42 to lead 47. A capacitor $C_{34}$ connects from the junction of resistors $R_{31}$ and $R_{32}$ to a lead 44, which connects to the system neutral. A resistor $R_{34}$ connects from the junction of capacitors $C_{31}$ and $C_{32}$ to lead 45, which connects to the system neutral. The lower terminal of $\overline{Z}_3$ also connects to the system neutral, through lead 45.

If certain constraints are placed on the values of the circuit elements in FIG. 3, then the output voltage $\overline{V}_3$ will be equal to the positive-sequence symmetrical component times a constant. It is not known whether more than one set of constraints will lead to this result, but it is known that the following set of constraints will result in the desired proportionality.

Specifically, if $$\frac{1}{\omega C_{32}} = R_{31} + R_{32} - \frac{1}{\omega C_{31}},$$

$$\frac{1}{\omega C_{33}} = 5.464 \, (R_{31} + R_{32}),$$

$$\frac{1}{\omega C_{34}} = 0.2680 \, \frac{R_{31} R_{32}}{R_{31} + R_{32}},$$

$$R_{33} = 5.464 \, (R_{31} + R_{32}),$$

$$R_{34} = 0.2680 \, \frac{(R_{31} + R_{32})\omega C_{31} - 1}{(R_{31} + R_{32})(\omega C_{31})^2},$$

and $$K_3 = \frac{(R_{31} + R_{32})(\omega C_{31})^2}{R_{31} R_{32} [(R_{31} + R_{32})\omega C_{31} - 1]},$$

network analysis techniques, such as nodal analysis, yield that the output voltage, which is the voltage drop across output load impedance $\overline{Z}_3$ from leads 47 to 45 is $$\overline{V}_3 = \frac{11.59 \, K_3 e^{j15°}}{\overline{D}_3} \left( \frac{\overline{V}_{10} + e^{j120°} \overline{V}_{11} + e^{j240°} \overline{V}_{12}}{3} \right)$$

$$= \alpha_3 e^{j\theta_3} \left( \frac{\overline{V}_{10} + e^{j120°} \overline{V}_{11} + e^{j240°} \overline{V}_{12}}{3} \right).$$

where $\overline{V}_{10}$, $\overline{V}_{11}$, and $\overline{V}_{12}$ are the phasor representations of the voltage drops from conductors 10–12, respectively, to the three-phase power system neutral and where $\overline{D}_3$, the nodal system determinant, is given by $$\overline{D}_3 = (\omega C_{32})^2 \left( \frac{1}{R_{31}} + \frac{1}{R_{32}} + j\omega C_{34} \right)$$

$$- \frac{1}{(R_{32})^2} \left( \frac{1}{R_{34}} + j\omega C_{31} + j\omega C_{32} \right)$$

$$+ \left[ \left( \frac{1}{R_{31}} + \frac{1}{R_{32}} + j\omega C_{34} \right) \left( \frac{1}{R_{34}} + j\omega C_{31} + j\omega C_{32} \right) \right.$$

$$\left. \left( \frac{1}{R_{32}} + \frac{1}{R_{33}} + j\omega C_{32} + j\omega C_{33} + \frac{1}{\overline{Z}_3} \right) \right].$$

As in the embodiments shown in FIGS. 1 and 2, if the line voltage sequence is 10, 11 and 12, then $\overline{V}_3$ equals $\alpha_3$ times the magnitude of the positive-sequence symmetrical component, and the phase angle of $\overline{V}_3$ equals the phase angle of the positive-sequence symmetrical component of $\overline{V}_{10}$ plus a constant, $\theta_3$.

If leads 42 and 43 are interchanged in FIG. 3 while all other connections and constraints along with the line voltage sequence remain the same, then the magnitude of $\overline{V}_3$ equals $\alpha_3$ times the magnitude of the negative-sequence symmetrical component, and the phase angle of $\overline{V}_3$ equals the phase angle of the negative-sequence symmetrical component of $\overline{V}_{10}$ plus a constant, $\theta_3$.

Despite the fact that the circuit of FIG. 3 requires a greater number of components than the embodiments of FIGS. 1 and 2, it does have certain advantages. The fact that the output voltage is developed across a load which has one terminal connected to the system neutral makes it more convenient to connect electronic voltage sensing and switching circuits to the sequence analyzer output, since the electronic circuits generally have their signal ground connected to a neutral. The use of system neutral for the common terminal also results in reduced system noise. Again, selection of four free parameters, for example, $R_{31}$, $R_{32}$, $C_{31}$ and $\overline{Z}_3$, allows the designer to adapt the circuit's constant of proportionality to a given application.

It will be appreciated that the output load impedance $\overline{Z}_1$, $\overline{Z}_2$, or $\overline{Z}_3$ can be either a pure resistance or a complex impedance. The nature of the load impedance does not affect the analysis function performed by the sequence analyzers according to the present invention. Rather, the nature of the load impedance affects only the magnitude and angle of the constant of proportionality which relates the resultant output voltage $\overline{V}_1$, $\overline{V}_2$, or $\overline{V}_3$, to the symmetrical component. Great freedom is thereby afforded in selecting the output load impedance as the input impedance of a wide variety of utilization devices which may be used in conjunction with the symmetrical component sequence analyzers of the present invention.

Figure 4:
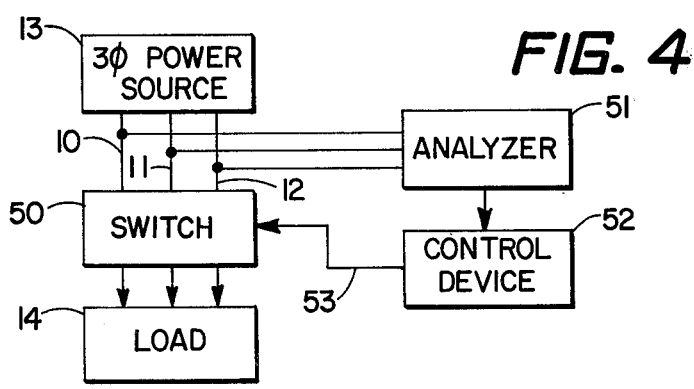
FIG. 4 is a block diagram of a monitoring system using analyzers according to the present invention as sensing elements.

In FIG. 4, there is shown a block diagram of a power monitoring system which uses the analyzers of the present invention as sensing elements. In FIG. 4, reference numeral 13 designates a three-phase power source, as in the previous figures. Power lines 10, 11 and 12 convey the three-phase power source through a switching element 50 to a load 14, which may be an electric motor, for example. Input means connected to power lines 10–12 convey the three-phase power voltages to analyzer 51. Analyzer 51 may be any of the circuits of FIGS. 1, 2, or 3, however, if FIG. 3 is used, an additional power line representing the system neutral would be required. Analyzer 51 provides an output voltage having a magnitude proportional to the magnitude of the positive or negative (depending upon the input connection) sequence symmetrical component of the three-phase power source. This output voltage is supplied to a control device 52 which is designed to respond to an out-of-tolerance voltage condition, according to the particular application. When an out-of-tolerance condition is detected, the control device 52 sends a control signal through lead 53 to open switch 50, thereby protecting the motor or other load 14 from a dangerous power supply condition.

For some applications it may be desirable to include current transformers as part of the input means for connecting the analyzer circuit to the three-phase power source, instead of a direct connection. Such a connection would apply voltages to the analyzer which are proportional to the current being drawn in the three-phase system. The analyzer would then function as described above, but the output would be proportional to the symmetrical component of the three-phase current, rather than the three-phase voltage.

In summary, according to the present invention I have provided positive and negative symmetrical component sequence analyzers which comprise only resistive and capacitive circuit elements. By eliminating the need for inductors or transformers, significant improvements in linearity, compactness and lowering of manufacturing costs are achieved.

I claim:

1. A symmetrical component sequence analyzer for providing output signals proportional to the positive or negative sequence symmetrical component of a three-phase power source, comprising:
   a. first, second and third input means for connection to a three-phase power source;
   b. an output terminal;
   c. first and second resistance elements connected in series between said first input means and said output terminal;
   d. a first capacitance element connected between said second input means and said output terminal;
   e. a third resistance element connected between said second input means and the connection of said first and second resistance element; and
   f. a second capacitance element connected between said third input means and the connection of said first and second resistance element;
   g. whereby said output signals proportional to the symmetrical component of the three-phase power source are developed between said output terminal and said third input means.

2. A symmetrical component sequence analyzer according to claim 1, wherein the resistance of said second resistance element equals $$K\left(\frac{2R_1 + R_3}{R_1 R_3^2}\right).$$

the reactance of said first capacitance element equals $$\frac{R_1^2 R_3^2 + K(3R_1 R_3 + 2R_1^2 + R_3^2)}{\left(\frac{\sqrt{3}}{2}\right) R_1 R_3^2}$$

and the reactance of said second capacitance element equals $$\frac{\sqrt{3} \, KR_1 R_3^2}{R_1^2 R_3^2 + K(3R_1 R_3 + 2R_1^2 + R_3^2)}$$

where $R_1$ equals the value of said first resistance element, $R_3$ equals the value of said third resistance element, and K equals a selected constant.

3. A symmetrical component sequence analyzer according to claim 2 further including control means connected to said output terminals for providing a control signal when said output signals reach a predetermined value, and switching means connected to receive said control signals from said control means, said switching means for controlling the connection of a load to the three-phase power source in response to said control signals.

4. A symmetrical component sequence analyzer according to claim 1 further including an output load impedance connected between said output terminal and said third input means.

5. A symmetrical component sequence analyzer for providing output signals proportional to the positive or negative sequence symmetrical component of a three-phase power source, comprising:
   a. first, second and third input means for connection to the three phases of a three-phase power source, and fourth input means for connection to the neutral point of a three-phase power source;
   b. first and second ouput terminals, said second terminal connected to said fourth input means;
   c. first and second resistance elements connected in series between said first input means and said first output terminal;
   d. first and second capacitance means connected in series between said third input means and said first output terminal;
   e. a third resistance element and a third capacitance element connected in parallel with each other between said second input means and said first output terminal;
   f. a fourth capacitance element connected between said fourth input means and the connection of said first and second resistance elements; and
   g. a fourth resistance element connected between said fourth input means and the connection of said first and second capacitance elements.

6. A symmetrical component sequence analyzer according to claim 5, wherein the value of said third resistance element equals $5.46(R_1+R_2)$, the value of said fourth resistance element equals $$.268\left(\frac{R_1 + R_2 - X_1}{R_1 + R_2}\right) X_1,$$

the reactance of said second capacitance element equals $R_1+R_2-X_1$, the reactance of said third capacitance element equals $5.46(R_1+R_2)$, and the reactance of said fourth capacitance element equals $$.268\left(\frac{R_1 R_2}{R_1 + R_2}\right),$$

where $R_1$ equals the value of said first resistance element, $R_2$ equals the value of said second resistance element, and $X_1$ equals the reactance of said first capacitance element.

7. A symmetrical component sequence analyzer according to claim 6 further including control means connected to said output terminals for providing a control signal when said output signals reach a predetermined value, and switching means connected to receive said control signals from said control means, said switching means for controlling the connection of a load to the three-phase power source in response to said control signals.

8. A symmetrical component sequence analyzer according to claim 5 further including an output load impedance connected to said output terminals.

* * * * *

UNITED STATES PATENT AND TRADEMARK OFFICE
CERTIFICATE OF CORRECTION

PATENT NO. : 4,023,075
DATED : May 10, 1977
INVENTOR(S) : William L. Reuter

It is certified that error appears in the above-identified patent and that said Letters Patent are hereby corrected as shown below:

Column 1, line 35, the word ending "laton" should be changed to --lation--.

Column 2, line 66, the numbers "2-22" should be changed to --20-22--.

Column 5, line 27, the word "In" should be changed to the word --If--.

Signed and Sealed this second Day of August 1977

[SEAL]

Attest:

RUTH C. MASON
*Attesting Officer*

C. MARSHALL DANN
*Commissioner of Patents and Trademarks*